United States Patent [19]

Akitaya et al.

[11] Patent Number: 5,130,357
[45] Date of Patent: Jul. 14, 1992

[54] FLAME RETARDANT POLYPROPYLENE RESIN COMPOSITION

[75] Inventors: Shinichi Akitaya; Tooru Fukazawa; Nobuchika Tabata, all of Ichihara, Japan

[73] Assignee: Chisso Corporation, Osaka, Japan

[21] Appl. No.: 503,871

[22] Filed: Apr. 3, 1990

[30] Foreign Application Priority Data

Apr. 4, 1989 [JP] Japan .................................. 1-84076
Jun. 16, 1989 [JP] Japan .................................. 1-154057
Jul. 25, 1989 [JP] Japan .................................. 1-191960

[51] Int. Cl.⁵ .......................................... C08K 5/3492
[52] U.S. Cl. ................................... 524/100; 524/211; 524/212; 524/213; 524/216; 524/188; 524/262; 524/264; 524/416
[58] Field of Search ............... 524/100, 211, 212, 213, 524/216, 188, 262, 264, 416

[56] References Cited

U.S. PATENT DOCUMENTS 4,298,509 11/1981 Fochesato .......................... 524/416
4,966,931 10/1990 Akitaya .............................. 524/416

FOREIGN PATENT DOCUMENTS 3037145 2/1988 Japan .................................. 524/262

Primary Examiner—Paul R. Michl
Assistant Examiner—Andrew E. C. Merriam
Attorney, Agent, or Firm—Leydig, Voit & Mayer

[57] ABSTRACT

The present flame retardant compositions of polypropylene resin contains polypropylene as a principal constituent and the following constituents making a total of 100 wt %: (A) silane coupling agent and/or (D) olefinic synthetic rubber, (B) ammonium polyphosphate or melamine-modified ammonium polyphosphate, and (C) one or more nitrogen organic compounds which are producible nonflammable gas products and carbonaceous residues by the pyrolysis of the mixture.

Further, the other compositions of polypropylene resin contains (E) polyethylene resin along with the above constituents making a total of 100 wt %.

Moreover, the other compositions contains (E) polyethylene resin, and (F) crosslinking agent and (G) thiophosphite along with above constituents making a total of 100 wt. %.

24 Claims, No Drawings

FLAME RETARDANT POLYPROPYLENE RESIN COMPOSITION

BACKGROUND OF THE INVENTION

The present invention relates to flame retardant polypropylene resin compositions. More particularly, the present invention relates to flame retardant polypropylene resin compositions which principally contain polypropylene resin. The compositions are fabricated without generating corrosive gas or toxic gas, the fabrication quality is little lowered, the fabricated articles are very fire retardant, and the bleeding of the fire retardant additive to the surface of the fabricated articles is slight under high humidity conditions.

Hitherto, polypropylene resin is widely used in fields of household electric appliances, buildings, interior decoration, automobile parts, etc., because the resin has good processing characteristics, chemical resistance, weathering resistance, electrical properties and mechanical strength.

Polypropylene resin is naturally flammable. However, there have been growing demands for flame retardant materials having many uses. For filling these demands, several kinds of flame retardant polypropylene resin compositions have been provided.

As such flame retardant polypropylene resin compositions, the following compositions are exemplified; a composition obtained by adding hydrous inorganic compounds, for example, magnesium hydroxide, aluminium hydroxide or hydrotalsite to polypropylene resin as shown in Japanese Laid-open Patent Publication Nos. 53-92855, 54-29350, 54-77658, 56-26954, 57-87462, 60-110738, etc., a composition obtained by adding polyethylene having a melt index of 0.01–2.0, a halogen compound such as decabromodiphenyl ether or dodecachloro-dodecahydromethanodibenzocyclooctene, and one or more inorganic fillers selected from the group consisting of powder talc, kaolinite, celesitite, silica and diatomite to polypropylene resin as shown in Japanese Patent Publication No. 55-30739 and a composition obtained by adding ammonium phosphate (or amine phosphate), a reaction product of a nitrogen compound containing >C=O (or >C=S or >NH) which is inserted in a ring structure and an aldehyde or an oligomer (or a polymer) of a 1,3,5-triazine derivative to poly-propylene resin as shown in Japanese Laid-open Patent Publication Nos. 52-146452 and 59-147050.

However, in the composition obtained by adding a hydrous inorganic compound such as magnesium hydroxide to polypropylene resin, to obtain high flame retardance, it is necessary to add a great quantity of the hydrous inorganic compound, and as a result the moldability of the composition deteriorates.

When the composition obtained by adding a halogen compound to polypropylene is used, the moldability is not so bad, and the composition has high flame retardance. However, the composition has problems that corrosive gas and toxic gas are produced in the fabrication or in the combustion.

Further, when the compositions disclosed in Japanese Laid-open Patent Publication Nos. 52-146452 and 59-147050 are used, the lowering of fabrication quality of the compositions is relatively small, and the production of corrosive gas and toxic gas is little.

However, the composition shows a flame retardant rank or rating of V-0 at a thickness of 1/8 inches by using a test (abbreviated as UL94 vertical burning test hereinafter) based on the vertical burning test of "Flammability test of plastic materials for instrument parts" of UL subject 94 (Underwriters Laboratories Incorporation). However, in the 5V test in which higher flame retardance is required, it is difficult to obtain a high flame retardant rating of 5V at a thickness of 1/8 inches, because drops drip and combusted pieces fall by melting (these drops and falling bodies are abbreviated as drops and the nature that causes dripping is abbreviated as drip characteristics), and it is also difficult to obtain a high flame retardant rating of V-0 at a thickness of 1/32 inches. Further, since ammonium phosphate or amine phosphate in the compositions has moisture-adsorption characteristics, the bleeding of ammonium phosphate or amine phosphate frequently occurs on the surface of the articles molded under very moist conditions, for example, in the rainy season. As a result, there is a problem in that the compositions are unsuitable for use as electrical insulating materials under such conditions, because the electrical resistance of the molded articles is greatly reduced.

The inventors of the present invention carried out research for resolving the above problems and obtaining flame retardant compositions of polypropylene resin which are highly flame retardant and show a flame retardant rating of 5V at a thickness of 1/8 inches or V-0 at a thickness of 1/32 inches by using a test (abbreviated as UL94 vertical burning test hereinafter) based on the vertical burning test of "Flammability test of plastic materials for instrument parts" of UL subject 94 (Underwriters Laboratories Incorporation). When the compositions are fabricated or burnt, corrosive gas and toxic gas are not produced. They also carried out research for obtaining compositions that corrosive gas and toxic gas are not produced and the lowering of the fabrication quality is little in fabricating or burning them, and the bleeding of flame retardant additives to the surface of the articles molded from the composition is very little under high humid conditions, for example, in the rainy season.

SUMMARY OF THE INVENTION

The inventors of the present invention have found that the above problems are solved by compositions which are obtained by adding to polypropylene a certain amount of olefin synthetic rubber and/or silane coupling agent, ammonium polyphosphate or melamine-modified ammonium polyphosphate, and one or more nitrogen organic compounds which upon pyrolysis of the mixture of the one or more nitrogen organic compounds, polypropylene resin and ammonium polyphosphate or melamine-modified ammonium polyphosphate are capable of producing nonflammable gas products and carbonaceous residues.

Further, they have found that the above problems are solved by compositions which are obtained by adding a certain amount of polyethylene resin along with above olefin synthetic rubber and/or silane coupling agent, ammonium polyphosphate or melamine-modified ammonium polyphosphate, and one or more nitrogen organic compound to the polypropylene resin.

Moreover, they have found that above problems are solved by compositions which are obtained by adding a certain amount of polyethylene resin, olefin synthetic rubber and/or silane coupling agent, ammonium polyphosphate or melamine-modified ammonium polyphosphate, a crosslinking agent, certain thiophosphites, and one or more nitrogen organic compounds to polypropylene resin.

Accordingly, the objects of the present invention are to solve the above problems and to provide new flame retardant compositions of polypropylene resin by which fabricated articles having high flame retardance are provided.

The flame retardant compositions of polypropylene resin of the present invention consist of the following (1) to (9):

(1) A flame retardant composition of polypropylene resin containing polypropylene as a principal constituent and the following (A) to (C) making a total of 100 wt %:

| | |
|---|---|
| (A) silane coupling agent | 0.3-5 wt %, |
| (B) ammonium polyphosphate or melamine-modified ammonium polyphosphate | 12-25 wt %, and |
| (C) one or more nitrogen organic compounds which upon the pyrolysis of the mixture of the one or more nitrogen organic compounds, polypropylene resin and ammonium polysphate or melamine-modified ammonium polysphate is capable of producing nonflammable gaseous products and carbonaceous residues (abbreviated as nitrogen organic compound hereinafter) | 5-10 wt %. |

(2) A flame retardant composition of polypropylene resin containing polypropylene as a principal constituent and the following (B) to (D) making a total of 100 wt %:

| | |
|---|---|
| (B) ammonium polyphosphate or melamine-modified ammonium polyphosphate | 12-25 wt %, |
| (C) nitrogen organic compound | 5-10 wt %, and |
| (D) olefinic synthetic rubber | 3-25 wt %. |

(3) A flame retardant composition of polypropylene resin containing polypropylene as a principal constituent and the following (A) to (D) making a total of 100 wt %:

| | |
|---|---|
| (A) silane coupling agent | 0.3-5 wt %, |
| (B) ammonium polyphosphate or melamine-modified ammonium polyphosphate | 12-25 wt %, |
| (C) nitrogen organic compound | 5-10 wt %, and |
| (D) olefinic synthetic rubber | 3-25 wt %. |

(4) A flame retardant composition of polypropylene resin containing polypropylene as a principal constituent and the following (A) to (C) to (E) making a total of 100 wt %:

| | |
|---|---|
| (A) silane coupling agent | 0.3-5 wt %, |
| (B) ammonium polyphosphate or melamine-modified ammonium polyphosphate | 12-25 wt %, |
| (C) nitrogen organic compound | 5-10 wt %, and |
| (E) polyethylene resin | 5-25 wt %. |

(5) A flame retardant composition of polypropylene resin containing polypropylene as a principal constituent and the following (B) to (E) making a total of 100 wt %:

| | |
|---|---|
| (B) ammonium polyphosphate or melamine-modified ammonium polyphosphate | 12-25 wt %, |
| (C) nitrogen organic compound | 5-10 wt %, |
| (D) olefinic synthetic rubber | 3-25 wt %, and |
| (E) polyethylene resin | 5-25 wt %. |

(6) A flame retardant composition of polypropylene resin containing polypropylene as a principal constituent and the following (A) to (E) making a total of 100 wt %:

| | |
|---|---|
| (A) silane coupling agent | 0.3-5 wt %, |
| (B) ammonium polyphosphate or melamine-modified ammonium polyphosphate | 12-25 wt %, |
| (C) nitrogen organic compound | 5-10 wt %, |
| (D) olefinic synthetic rubber | 3-25 wt %, and |
| (E) polyethylene resin | 5-25 wt %. |

(7) A flame retardant composition of polypropylene resin containing polypropylene as a principal constituent and the following (A) to (C) and (E) to (G) making a total of 100 wt %:

| | | |
|---|---|---|
| (A) | silane coupling agent | 0.3-5 wt %, |
| (B) | ammonium polyphosphate or melamine-modified ammonium polyphosphate | 12-25 wt %, |
| (C) | nitrogen organic compound | 5-10 wt %, |
| (E) | polyethylene resin | 5-30 wt %, |
| (F) | crosslinking agent | 1.0-15 wt %, and |
| (G) | one or more thiophosphites selected from the group consisting of the following general formula (I), (II), (III) and (IV) (abbreviated as thiophosphite hereinafter) | 0.05-5 wt % |

(I)

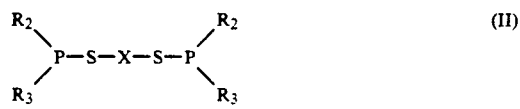

(II)

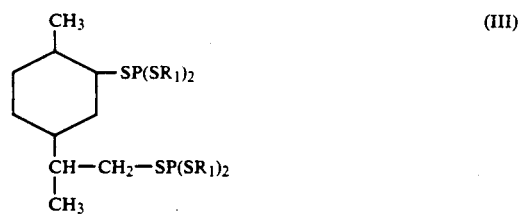

(III)

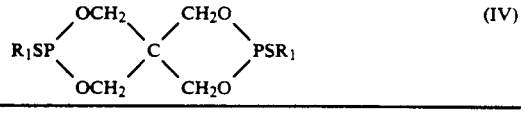

(IV)

wherein $R_1$ is alkyl, cycloalkyl or aryl of more than 6 carbon atoms, $R_2$ is $-SR_2'$ or $-R_2'$, $R_3$ is $-SR_3'$ or $-R_3'$, $-R_2'$ and $-R_3'$ are the same or different alkyl, cycloalkyl or aryl, X is $-(CH_2)_n-$, $-(CH_2)_n-O-(CH_2)_m$, or

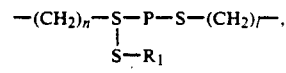

n, m and l are the same or different integers of 2-6.

(8) A flame retardant composition of polypropylene resin containing polypropylene as a principal constituent and the following (B) to (G) making a total of 100 wt %:

| (B) ammonium polyphosphate or melamine-modified ammonium polyphosphate | 12-25 wt %, |
| --- | --- |
| (C) nitrogen organic compound | 5-10 wt %, |
| (D) olefinic synthetic rubber | 3-25 wt %, |
| (E) polyethylene resin | 5-30 wt %, |
| (F) crosslinking agent | 1.0-15 wt %, and |
| (G) thiophosphite | 0.05-5 wt %. |

(9) A flame retardant composition of polypropylene resin containing polypropylene as a principal constituent and the following (A) to (G) making a total of 100 wt %:

| (A) silane coupling agent | 0.3-5 wt %, |
| --- | --- |
| (B) ammonium polyphosphate or melamine-modified ammonium polyphosphate | 12-25 wt %, |
| (C) nitrogen organic compound | 5-10 wt %, |
| (D) olefinic synthetic rubber | 3-25 wt %, |
| (E) polyethylene resin | 5-30 wt %, |
| (F) crosslinking auxiliary | 1.0-15 wt %, and |
| (G) thiophosphite | 0.05-5 wt %. |

In these compositions, one or more nitrogen organic compounds are selected from the group consisting of reaction products of ethylene urea and formaldehyde, reaction products of ethylene thiourea and formaldehyde, and 1,3,5-triazine derivatives represented by the formula:

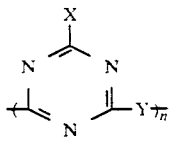
(V)

wherein X is morpholino or piperidino, Y is a two valence group of piperazine, and n is an integer of 2 to 50.

DETAILED DESCRIPTION OF THE INVENTION

A crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above group are exemplified as the polypropylene resin which is used in the present invention. Particularly, a crystalline ethylene-propylene block copolymer is preferred.

High-density polyethylene, medium-density polyethylene and low-density polyethylene are usable as polyethylene resin used in the present invention. For preventing the lowering of stiffness of molded articles, the use of high-density polyethylene is desired.

The mixing amount of the polyethylene resin is 5-30 wt % per 100 wt % of the composition, preferably 7-20 wt % and more preferably 10-20 wt %. When the amount is less than 5 wt %, it is unable to obtain the flame retardant rank of 5V at a thickness of ⅛ inches or V-0 at a thickness of 1/32 inches by using an UL94 vertical burning test. When the amount is more than 30 wt %, it is also unable to obtain the flame retardant rank of 5V at a thickness of ⅛ inches or V-0 at a thickness of 1/32 inches.

Silane coupling agents used in the present invention are silane compounds represented by the formula: $RR'SiX_2$ wherein R is a hydrocarbon having vinyl, chloro, amino, mercapto, or the like , X is an organic group which is hydrolyzable, R' is R or X, and each R (when R' is R) may be different and each X may be different from each other. Vinyl trimethoxy silane, vinyl triethoxy silane, 3-aminopropyl triethoxy silane, N-(2-aminoethyl)3-aminopropyl trimethoxy silane, 3-glycidoxypropyl trimethoxy silane, 3-chloropropyl trimethoxy silane, 3-methacryloxypropyl trimethoxy silane and 3-mercaptopropyl trimethoxy silane are exemplary of the compounds which may be used as silane coupling agents. Among them, vinyl trimethoxy silane, vinyl triethoxy silane and 3-mercaptopropyl trimethoxy silane are preferably used for preventing the bleeding of ammonium polyphosphate or melamine-modified ammonium used under high wet conditions. The mixing amount of the silane coupling agents is 0.3-5 wt % per 100 wt % of the composition, preferably 0.5-3 wt % and more preferably 0.5-1 wt %. When the amount is less than 0.3 wt %, it is difficult to prevent the bleeding of ammonium polyphosphate or melamine-modified ammonium phosphate used under high moisture conditions. When the amount is more than 5 wt %, it is not preferred because the flame retardant rank of 5V at a thickness of ⅛ inches or V-0 at a thickness of 1/32 inches is not obtained.

As the olefinic synthetic rubber used in the present invention, ethylene-propylene rubber, ethylene-propylene-diene rubber, ethylene-1-butene rubber and ethylene-vinyl acetate rubber are exemplified. Among them, ethylene-propylene rubber and ethylene-propylene-diene rubber are preferably used for maintaining high flame retardancy. The mixing amount of the olefinic synthetic rubber is 3-25 wt % per 100 wt % of the composition, preferably 3-20 wt % and more preferably 3-15 wt %. When the amount is less than 3 wt %, it is difficult to prevent the bleeding of ammonium polyphosphate or melamine-modified ammonium used under high wet conditions. When the amount is more than 25 wt %, it is not preferred because the stiffness of the obtained articles is reduced, and good mechanical strength and heat resistance originating from polypropylene are lost.

Ammonium polyphosphate or melamine-modified ammonium polyphosphate used in the present invention is usable as it is placed on the market without further purifying. For example, commercially obtainable ammonium polyphosphate suitable for use is Sumisafe P (Trade name, manufactured by Sumitomo Chemical Co., Ltd.) or Exolit 422 (Trade name, manufactured by Hext Company). Melamine-modified ammonium polyphosphate used in the present invention is sold as Sumisafe PM (Trade name, manufactured by Sumitomo Chemical Co., Ltd.) or Exolit 462 (Trade name, manufactured by Hext Company). The mixing amount of ammonium polyphosphate or melamine-modified ammonium polyphosphate is 12-25 wt % per 100 wt % of the composition. When the amount is less than 12 wt %, it is unable to obtain the flame retardant rank of 5V at a thickness of ⅛ inches or V-0 at a thickness of 1/32 inches. When the amount is more than 25 wt %, there is no affect on the improvement of flame retardancy.

As nitrogen organic compounds used in the present invention, the following compounds are exemplified. Namely, the compounds are one or more nitrogen organic compounds or reaction products which produce nonflammable gas products (such as water, carbon dioxide, ammonium and nitrogen) and carbonaceous residues when the mixture of nitrogen organic compounds, polypropylene resin and ammonium polyphosphate or melamine-modified ammonium polyphosphate is pyrolyzed by ignition or flame contact. Such compounds are ethylene urea, ethylene thiourea, hydantoin, hexahydropyrimidine-2-one, piperazine-3,6-dione, barbituric acid, uric acid, dicyandiamide, reaction products of these compounds and aldehydes, reaction products of piperazine and diphenyl carbonate, reaction products of imidazoline-2-one and diphenyl carbonate, oligomers or polymers of 2-piperazinilene-4-morpholino-1,3,5-triazine, oligomers or polymers of 2-piperazinilene-4-piperizino-1,3,5-triazine, etc. In these compounds, reaction products of urea and formaldehyde, reaction products of ethylene thiourea and formaldehyde, an oligomer or polymers of 2-piperazinilene-4-morpholino-1,3,5-triazine which are derivatives of 1,3,5-triazine represented by the following formula (V), and an oligomer or polymers of 2-piperazinilene-4-piperizino-1,3,5-triazine are preferably used for maintaining high flame retardance.

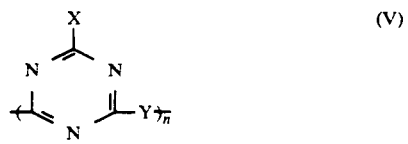

wherein X is morpholino or piperidino, Y is a two divalent group of piperazine, and n is an integer of 2 to 50.

The mixing amount of the nitrogen organic compounds is 5-10 wt % per 100 wt % of the composition. When the amount is less than 5 wt %, it is unable to obtain the flame retardant rank of 5V at a thickness of ⅛ inches or V-0 at a thickness of 1/32 inches by using an UL94 vertical burning test. When the amount is more than 10 wt %, there is no affect on the improvement of flame retardancy.

Reaction products of ethylene urea and formaldehyde, reaction products of ethylene thiourea and formaldehyde, an oligomer or polymers of 2-piperazinilene-4-morpholino-1,3,5-triazine, and an oligomer or polymers of 2-piperazinilene-4-piperizino-1,3,5-triazine which are nitrogen organic compounds are obtained by the following methods, respectively.

To obtain a reaction product of ethylene thiourea and formaldehyde, 50 g of ethylene thiourea is dissolved in 1 liter of water, dilute acid (for example, sulfuric acid or phosphoric acid) is added to obtain an acid solution having pH 2, then the solution is heated at 90° C., and an aqueous solution of 37 wt % formaldehyde is added dropwise to the ethylene thiourea solution with vigorous stirring at 90° C. until the mole ratio of $CH_2O$/ethylene thiourea goes up to 2. The precipitates obtained in the form of very fine powder are filtered, washed with water and dried. Further, a reaction product of ethylene urea and formaldehyde is obtainable by a similar method as above.

For obtaining an oligomer or polymers of 2-piperazinilene-4-morpholino-1,3,5-triazine, equimolar amounts of 2,6-dihalo-4-morpholino-1,3,5-triazine (for example, 2,6-dichloro-4-morpholino-1,3,5-triazine or 2,6-dibromo-4-morpholino-1,3,5-triazine) and piperazine are reacted in an inactive solvent such as xylene in the presence of an organic base or an inorganic base (for example, triethylamine, tributylamine, sodium hydroxide, potassium hydroxide or sodium carbonate) by heating, preferably at the boiling point of the inactive solvent. After the reaction, the reaction products are filtered and washed with boiling water, byproduct salts which are dissolved in the boiling water are separated and removed, and the precipitates formed are washed with boiling water and dried.

For obtaining an oligomer or polymers of 2-piperazinilene-4-piperizino-1,3,5-triazine, equimolar amounts of 2,6-dihalo-4-piperizino-1,3,5-triazine (for example, 2,6-dichloro-4-piperizino-1,3,5-triazine or 2,6-dibromo-4-piperizino-1,3,5-triazine) and piperazine are reacted in an inactive solvent such as triisopropylbenzene in the presence of an organic base or an inorganic base (for example, triethylamine, tributylamine, sodium hydroxide, potassium hydroxide or sodium carbonate) by heating, preferably at the boiling point of the inactive solvent. After reaction, the reaction products are filtered and washed with boiling water, byproduct salts which are dissolved in the boiling water are separated and removed, and the precipitates formed are washed with boiling water and dried.

As the crosslinking agent used in the present invention, a polyfunctional monomer, an oxime nitroso compound, a maleimide compound or the like can are exemplary. For example, triallyl isocyanurate, (di)ethylene glycol di(meta)acrylate, trimethylolpropane triacrylate, trimethylolethylene triacrylate, pentaerythritol triacrylate, pentaerythritol tetra-acrylate, divinyl benzene, diallyl phthalate, divinyl pyridine, quinone dioxime, benzoquinone dioxime, p-nitrosophenol, N,N'-m-phenylenebismaleimide or the like can be exemplified, preferably, a polyfunctional (meta) acrylate such as trimethylolpropane tri(meta)acrylate or pentaerythritol triacrylate is used.

The mixing amount of the crosslinking agent is 1.0-15 wt %, preferably 1-7 wt %. When the amount is less than 1.0 wt %, the effect of drip prevention is minimal in the combustion of the composition. When the amount is more than 15 wt %, there is no additional affect of the improvement of drip prevention.

As the thiophosphites represented by the above general formula (I), (II), (III) and (IV) used in the present invention, trilauryl trithiophosphite, tridecyl trithiophosphite, tribenzyl trithiophosphite, tricyclohexyl trithiophosphite, tri(2-ethylhexyl)trithiophosphite, trinaphthyl trithiophosphite, diphenyl decyl trithiophosphite, diphenyllauryl trithiophosphite, tetralauryl-4-oxabutylene-1,7-tetrathiophosphite, tetrakis(mercaptolauryl)-1,6-dimercaptohexylene diphosphite, pentakis(mercaptolauryl)bis(1,6-hexylenedimercapto)trithiophosphite, tetrakis(mercaptolauryl)-2,9-dimercaptopara-menthylenediphosphite, bis(mercaptolauryl)-1,6-dimercaptohexylene-bis(benzenephosphonite), tetrakis(mercaptolauryl)-2,9-dimercaptopara-methylene diphosphite, dioctyldithiopentaerythritol diphosphite, dilauryldipentaerythritol diphosphite, phenyllauryldithiopentaerythritol diphosphite, and mixture of these two or more compounds can be exemplified.

The mixing amount of the thiophosphite is 0.05-5 wt %, preferably 0.1-2 wt %. When the amount is less than 0.05 wt %, the effect of drip prevention is minimal. When the amount is more than 5 wt %, there is no additional affect on the improvement of drip prevention effect.

Naturally, several kinds of additives such as antioxidants, antistatic agents, lubricants and pigments which are addable to polypropylene resin are usable together with the compositions of the present invention.

The flame retardant polypropylene resin compositions of the present invention may be produced by the following method.

Namely, fixed amounts of polypropylene resin, polyethylene resin, olefinic synthetic rubber and/or a silane coupling agent, ammonium polyphosphate or melamine-modified ammonium polyphosphate, nitrogen organic compounds, a crosslinking agent, thiophosphites and various additives are charged into stirring and mixing equipment, such as, for example, a Henschel mixture (Trade name), a super mixer or a tumbler mixer, and these compounds are mixed with stirring for 1 to 10 minutes. The mixture was fused and kneaded by using a roll or an extruder at a temperature of 170-220° C. to obtain a pellet.

Merits of the invention are as follows.

The compositions of the present invention exhibit minimal bleeding on the surface of the articles molded under high temperature and high humidity conditions, and are flame retardant polypropylene resin compositions which are highly flame retardant and show a flame retardant rating of 5V at a thickness of ⅛ inches or V-0 at a thickness of 1/32 inches by using a UL94 vertical burning test. When the compositions are molded or burnt, no corrosive gas and toxic gas are produced Accordingly, the compositions are preferably usable for producing building materials, interior decorations, parts of electrical appliances and automobiles, etc..

DETAILED DESCRIPTION OF PREFERRED EMBODIMENTS

The present invention is illustrated by the following examples and comparative examples, and these examples are not to construed to limit the scope of the invention. The evaluation methods used in these examples are as follows:

1) Flame retardance

Based on the vertical (V-0 or 5V) vertical burning test of "Flammability test of plastic materials for instrument parts" of UL subject 94 (Underwriters Laboratories Incorporation). The thickness of test pieces is ⅛ inches (Examples 1-21 and Comparative Examples 1-9), 1/32 inches (Examples 22-43 and Comparative Examples 10-22) and ⅛ inches the remaining examples and comparative examples).

2) Bleeding under high humidity conditions

Test pieces having a length of 95 mm, a width of 95 mm and a thickness of 2 mm are molded by using an injection machine and placed in a thermo-hygrostat (manufactured by Tabai MFG) which is controlled at a temperature of 80° C. and a humidity of 80%. The test pieces are taken out of the thermo-hygrostat every due date. The test pieces are dried in a constant temperature drier (manufactured by Sanyo Denki Co., Ltd.) which is controlled at a temperature of 80° C. for 2 hours, it is allowed to stand in a desiccator overnight at room temperature, and the bleeding conditions of a flame retardant additive on the surface of the test piece is observed with the eye. Then, a surface resistivity of the test pieces is measured by using a vibratory volume microcurrent electrometer(manufactured by Takeda Riken Co., Ltd.).

EXAMPLE 1

6.9 kg of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 100 g of vinyltrimethoxysilane (manufactured by CHISSO CORPORATION, Sairaace (trade mark) S210), 2.1 kg of ammonium polyphosphate (manufactured by Sumitomo Chemical Co., Ltd., Sumisafe P (trade mark)), 800 g of a polymer of 2-piperazinilene-4-morpholino-1,3,5-triazine (n=11, molecular weight: about 2770) as a nitrogen organic compound, 15 g of 2,6-di-t-butyl-p-cresol, 20 g of di-myristyl-$\beta,\beta$-thiodipropionate and 10 g of calcium stearate as additives were charged into a Henschel mixer (trade name) and mixed with stirring for three minutes. The mixture obtained was molten and extruded at 200° C. with an extruder having a bore diameter of 45 mm to obtain pellets.

COMPARATIVE EXAMPLE 1

The same constituents as in Example 1, except that the amount of the polypropylene resin was changed to 7.0 kg and the silane coupling agent was not used, were charged into a Henschel mixer (trade name) and mixed with stirring, and the mixture obtained was molten and extruded to obtain pellets under the same conditions as in Example 1.

EXAMPLES 2-6

Pellets were obtained under the same conditions as in Example 1 except that the silane coupling agent was changed to the silane coupling agents shown in Table 1.

EXAMPLES 7-9, COMPARATIVE EXAMPLES 2 AND 3

Pellets were obtained under the same conditions as in Example 1 except that the mixing amounts of the polypropylene resin and the silane coupling agent were changed to those shown in Table 1.

EXAMPLE 10

Pellets were obtained under the same conditions as in Example 1 except that a reaction product of ethylene urea and formaldehyde was used as the nitrogen organic compound.

The pellets obtained in Examples 1-10 and Comparative Examples 1-3 were dried at 100° C. for three hours and molded with an injection molding machine in which the maximum temperature of the cylinder was set at 220° C. to obtain definite test pieces for evaluating their flame retardance and bleed resistance. The bleed resistance of the test pieces was evaluated under the conditions of high temperature and high humidity. The results are shown in Table 1.

As shown in Table 1, when the silane coupling agent was added, the bleeding under the conditions of high temperature and high humidity was improved. It was found that preferable formulation amounts of the silane coupling agent were 0.3-5 wt %.

EXAMPLE 11

6.0 kg of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 1.0 kg of ethylene-propylene rubber (manufactured by Japan Synthetic Rubber Co. Ltd., EP-02P) as olefinic synthetic rubber, 2.1 kg of ammonium polyphosphate (manufactured by Sumitomo Chemical Co., Ltd., Sumisafe P (trade mark)), 800 g of a polymer of 2-piperazinilene-4-morpholino-1,3,5-triazine (n=11, molecular weight: about 2770) as a nitrogen organic compound, 15 g of 2,6-di-t-butyl-p-cresol, 20 g of di-myristyl-$\beta,\beta$-thiodipropionate and 10 g of calcium stearate as additives were charged into a Henschel mixer (Trade name) and mixed with stirring for three minutes. The mixture obtained was molten and extruded at 200° C. with an extruder having a bore diameter of 45 mm to obtain pellets.

COMPARATIVE EXAMPLE 4

The same constituents as in Example 11, except that the amount of the polypropylene resin was changed to 7.0 kg and the ethylene-propylene rubber was not used were charged into a Henschel mixer (trade name) and mixed with stirring, and the mixture obtained was molten and extruded to obtain pellets under the same conditions as in Example 11.

EXAMPLES 12 AND 13, COMPARATIVE EXAMPLES 5

Pellets were obtained under the same conditions as in Example 11 except that the formulation amounts of the polypropylene resin and the ethylene-propylene rubber were changed to those shown in Table 2.

The pellets obtained in Examples 11-13 and Comparative Examples 4 and 5 were dried at 100° C. for three hours and molded with an injection molding machine in which the maximum temperature of the cylinder was set at 220° C. to obtain definite test pieces for evaluating their flame retardance and bleed resistance. The bleed resistance of the test pieces was evaluated under the conditions of high temperature and high humidity. The results are shown in Table 2.

As shown in Table 2, when the ethylene-propylene rubber was added, bleeding under conditions of high temperature and high humidity was improved. It was found that preferable formulation amounts of the ethylene-propylene rubber were 3-25 wt %.

EXAMPLE 14

5.9 kg of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 1.0 kg of ethylene-propylene rubber (manufactured by Japan Synthetic Rubber Co. Ltd., EP-02P) as olefinic synthetic rubber, 100 g of vinyltrimethoxysilane (manufactured by CHISSO CORPORATION, Sairaace (trade mark) S210) as a silane coupling agent, 2.1 kg of ammonium polyphosphate (manufactured by Sumitomo Chemical Co., Ltd., Sumisafe P (trade mark)), 800 g of a polymer of 2-piperazinilene-4-morpholino-1,3,5-triazine (n=11, molecular weight: about 2770) as a nitrogen organic compound, 15 g of 2,6-di-t-butyl-p-cresol, 20 g of di-myristyl-$\beta,\beta$-thiodipropionate and 10 g of calcium stearate as additives were charged into a Henschel mixer (Trade name) and mixed with stirring for three minutes. The mixture obtained was molten and extruded at 200° C. with an extruder having a bore diameter of 45 mm to obtain pellets.

COMPARATIVE EXAMPLE 6

The same constituents as in Example 14, except that the amount of the polypropylene resin was changed to 7.0 kg and the ethylene-propylene rubber and the silane coupling agent were not used, were charged into a Henschel mixer (trade name) and mixed with stirring, and the mixture obtained was molten and extruded to obtain pellets under the same conditions as in Example 14.

EXAMPLES 15-21, COMPARATIVE EXAMPLES 7-9

Pellets were obtained under the same conditions as in Example 14 except that the mixing amounts of the polypropylene resin, the ethylene-propylene rubber and the silane coupling agent were changed to those shown in Table 3.

The pellets obtained in Examples 14-21 and Comparative Examples 6-9 were dried at 100° C. for three hours and molded with an injection molding machine in which the maximum temperature of the cylinder was set at 220° C. to obtain definite test pieces for evaluating their flame retardance and bleed resistance. The bleed resistance of the test pieces was evaluated under the conditions of high temperature and high humidity. The results are shown in Table 3.

As shown in Table 3, when the silane coupling agent and the ethylene-propylene rubber were added, the bleeding under the conditions of high temperature and high humidity was improved.

TABLE 1

| | Constituents (wt %) | | | | | | Surface resistivity ($\Omega$) | | Days of no bleed | Flame retardance (3.0 mm) |
|---|---|---|---|---|---|---|---|---|---|---|
| | (A) | | (B) | (C) | | (P) | before moistening*1 | 7 days after moistening*2 | | |
| Example 1 | $A_1$ | 1.0 | 21 | $C_1$ | 8 | 70 | $8.5 \times 10^{17}$ | $5.5 \times 10^{17}$ | 20> | V-0 |
| Comparative Example 1 | | 0 | 21 | $C_1$ | 8 | 71 | $4.4 \times 10^{17}$ | $3.1 \times 10^{12}$ | 7> | V-0 |
| Example 2 | $A_2$ | 1.0 | 21 | $C_1$ | 8 | 70 | $6.2 \times 10^{16}$ | $3.3 \times 10^{16}$ | 14> | V-0 |
| Example 3 | $A_3$ | 1.0 | 21 | $C_1$ | 8 | 70 | $7.3 \times 10^{16}$ | $2.7 \times 10^{16}$ | 14> | V-0 |
| Example 4 | $A_4$ | 1.0 | 21 | $C_1$ | 8 | 70 | $7.6 \times 10^{17}$ | $4.5 \times 10^{16}$ | 14> | V-0 |
| Example 5 | $A_5$ | 1.0 | 21 | $C_1$ | 8 | 70 | $4.6 \times 10^{17}$ | $8.5 \times 10^{16}$ | 14> | V-0 |
| Example 6 | $A_6$ | 1.0 | 21 | $C_1$ | 8 | 70 | $3.0 \times 10^{16}$ | $2.2 \times 10^{17}$ | 20< | V-0 |
| Comparative Example 2 | $A_1$ | 0.2 | 21 | $C_1$ | 8 | 70.8 | $5.0 \times 10^{17}$ | $2.3 \times 10^{11}$ | 7> | V-0 |
| Example 7 | $A_1$ | 0.3 | 21 | $C_1$ | 8 | 70.7 | $4.2 \times 10^{16}$ | $3.0 \times 10^{16}$ | 14> | V-0 |
| Example 8 | $A_1$ | 0.5 | 21 | $C_1$ | 8 | 70.5 | $2.1 \times 10^{17}$ | $2.2 \times 10^{17}$ | 14> | V-0 |
| Example 9 | $A_1$ | 3.0 | 21 | $C_1$ | 8 | 68 | $5.3 \times 10^{16}$ | $4.9 \times 10^{16}$ | 20< | V-0 |
| Comparative Example 3 | $A_1$ | 6.0 | 21 | $C_1$ | 8 | 65 | $8.4 \times 10^{16}$ | $6.5 \times 10^{16}$ | 20< | impossible*3 |

TABLE 1-continued

|  | Constituents (wt %) | | | | Surface resistivity (Ω) | | Days of no bleed | Flame retardance (3.0 mm) |
|---|---|---|---|---|---|---|---|---|
|  | (A) | (B) | (C) | (P) | before moistening*1 | 7 days after moistening*2 | | |
| Example 10 | A₁ 1.0 | 21 | C₂ 8 | 70 | 7.7 × 10¹⁶ | 6.5 × 10¹⁶ | 20> | V-0 |

TABLE 2

|  | Constituents (wt %) | | | | Surface resistivity (Ω) | | Days of no bleed | Flame retardance (3.0 mm) |
|---|---|---|---|---|---|---|---|---|
|  | (D) | (B) | (C₁) | (P) | before moistening*1 | 7 days after moistening*2 | | |
| Example 11 | 10 | 21 | 8 | 61 | $3.7 \times 10^{17}$ | $4.8 \times 10^{17}$ | 20> | V-0 |
| Comparative Example 4 | 0 | 21 | 8 | 71 | $8.2 \times 10^{16}$ | $5.6 \times 10^{12}$ | 7> | V-0 |
| Example 12 | 3 | 21 | 8 | 68 | $6.3 \times 10^{17}$ | $5.6 \times 10^{16}$ | 14> | V-0 |
| Example 13 | 20 | 21 | 8 | 51 | $3.5 \times 10^{16}$ | $2.8 \times 10^{16}$ | 20< | V-0 |
| Comparative Example 5 | 30 | 21 | 8 | 41 | $5.6 \times 10^{16}$ | $6.1 \times 10^{16}$ | 20< | impossible*3 |

TABLE 3

|  | Constituents (wt %) | | | | | Surface resistivity (Ω) | | Days of no bleed | Flame retardance (3.0 mm) |
|---|---|---|---|---|---|---|---|---|---|
|  | (A₁) | (D) | (B) | (C₁) | (P) | before moistening*1 | 7 days after moistening*2 | | |
| Example 14 | 1.0 | 10 | 21 | 8 | 60 | $7.5 \times 10^{16}$ | $4.3 \times 10^{16}$ | 30< | V-0 |
| Comparative Example 6 | 0 | 0 | 21 | 8 | 71 | $5.9 \times 10^{17}$ | $2.5 \times 10^{12}$ | 7> | V-0 |
| Comparative Example 7 | 0.2 | 2 | 21 | 8 | 68.8 | $3.4 \times 10^{16}$ | $7.4 \times 10^{12}$ | 7> | V-0 |
| Example 15 | 0.3 | 3 | 21 | 8 | 67.7 | $5.5 \times 10^{16}$ | $2.3 \times 10^{16}$ | 20> | V-0 |
| Example 16 | 1.0 | 3 | 21 | 8 | 67 | $5.3 \times 10^{17}$ | $8.8 \times 10^{16}$ | 20> | V-0 |
| Example 17 | 0.3 | 5 | 21 | 8 | 65.7 | $6.3 \times 10^{16}$ | $4.2 \times 10^{16}$ | 20> | V-0 |
| Example 18 | 0.5 | 5 | 21 | 8 | 65.5 | $4.2 \times 10^{17}$ | $2.1 \times 10^{18}$ | 20< | V-0 |
| Example 19 | 1.0 | 5 | 21 | 8 | 65 | $8.3 \times 10^{17}$ | $6.5 \times 10^{16}$ | 20< | V-0 |
| Comparative Example 8 | 6.0 | 5 | 21 | 8 | 60 | $7.2 \times 10^{16}$ | $3.1 \times 10^{16}$ | 20< | impossible*3 |
| Example 20 | 0.5 | 10 | 21 | 8 | 60.5 | $6.4 \times 10^{16}$ | $5.1 \times 10^{18}$ | 20< | V-0 |
| Example 21 | 2.0 | 10 | 21 | 8 | 59 | $8.3 \times 10^{16}$ | $3.9 \times 10^{16}$ | 20< | V-0 |
| Comparative Example 9 | 1.0 | 30 | 21 | 8 | 40 | $7.8 \times 10^{16}$ | $4.7 \times 10^{16}$ | 20< | impossible*3 |

The marks in Table 1-3 are as follows:
Constituent (A): A₁: vinyl trimethoxy silane.
A₂: 3-aminopropyltriethoxysilane.
A₃: 3-methacryloxypropyltriethoxysilane.
A₄: 3-glycidoxypropyltrimethoxy silane.
A₅: 3-chloropropyltrimethoxy silane.
A₆: 3-mercaptopropyl trimethoxy silane.
Constituent (B): ammonium polyphosphate.
Contituent (C): C₁: a polymer (n = 11) of 2-piperazinilene-4-morpholino-1,3,5-triazine
C₂: a reaction product of ethylene urea and formaldehyde.
Constituent (D): ethylene propylene rubber (manufactured by Japan Synthetic Rubber Co. Ltd., EP-02P).
Constituent (P): as propylene resin, ethylene-propylene block copolymer (ethylene content: 8.5 wt %, melt index 20 g/10 min.).
*1Surface Resistivity before moistening treatment: surface electrical resistivity before exposing test pieces under the conditions of heating and moistening.
*2Surface Resistivity on 7th day after moistening treatment: surface electrical resistivity after exposing test pieces for 7 days at 80° C. and 80% humidity.
*3Evaluation is impossible: flame retardance was impossible to evaluate because test pieces went up in flames.

EXAMPLE 22

55 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 15 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 1.0 wt % of vinyl-trimethoxysilane (manufactured by CHISSO CORPORATION, Sairaace (trade mark) S210), 21 wt % of ammonium polyphosphate (manufactured by Sumitomo Chemical Co., Ltd., Sumisafe P (trade mark)), 8 wt % of a polymer of 2-piperazinilene-4-morpholino-1,3,5-triazine (n=11, molecular weight: about 2770) as a nitrogen organic compound, 0.15 wt % of 2,6-di-t-butyl-p-cresol, 0.2 wt % of dimyristyl-β, β-thiodipropionate and 0.1 wt % of calcium stearate as additives were charged into a Henschel mixer (trade name) and mixed with stirring for three minutes. The mixture obtained was molten and extruded at 200° C. with an extruder having a bore diameter of 45 mm to obtain pellets.

COMPARATIVE EXAMPLE 10

The same constituents as in Example 22, except that the amount of the polypropylene resin was changed to 56 wt % and the silane coupling agent was not used, were charged into a Henschel mixer (Trade name) and mixed with stirring, and the mixture obtained was molten and extruded to obtain pellets under the same conditions as in Example 22.

EXAMPLES 23-27

Pellets were obtained under the same conditions as in Example 22 except that the silane coupling agent was changed to the silane coupling agents shown in Table 4.

EXAMPLE 28-30, COMPARATIVE EXAMPLES 11 AND 12

Pellets were obtained under the same conditions as in Example 22 except that the mixing amounts of the polypropylene resin and the silane coupling agent were changed to those shown in Table 4.

EXAMPLE 31

Example 22 except that a reaction product of ethylene urea and formaldehyde was used as the nitrogen organic compound.

EXAMPLE 32, COMPARATIVE EXAMPLES 13 AND 14

Pellets were obtained under the same conditions as in Example 22 except that the mixing amounts of the polypropylene resin and the polyethylene resin were changed to those shown in Table 4.

The pellets obtained in Examples 22-32 and Comparative Examples 10-14 were dried at 100° C. for three hours and molded with an injection molding machine. The maximum temperature of the cylinder was set at 220° C. to obtain definite test pieces for evaluating their flame retardance and bleed resistance.

The bleed resistance of the test pieces was evaluated under the conditions of high temperature and high humidity. The results are shown in Table 4.

As shown in Table 4, when the silane coupling agent was added, the bleeding under the conditions of high temperature and high humidity was improved. It was found that preferable formulation amounts of the silane coupling agent were 0.3-5 wt %.

EXAMPLE 33

51 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 10 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 10 wt % of ethylene-propylene rubber (manufactured by Japan Synthetic Rubber Co. Ltd., EP-02P) as olefinic synthetic rubber, 21 wt % of ammonium polyphosphate (manufactured by Sumitomo Chemical Co., Ltd., Sumisafe P (trade mark)), 8 wt % of a polymer of 2-piperazinilene-4-morpholino-1,3,5-triazine (n=11, molecular weight: about 2770) as a nitrogen organic compound, 0.15 wt % of 2,6-di-t-butyl-p-cresol, 0.2 wt % of di-myristyl-$\beta,\beta$-thiodipropionate and 0.1 wt % of calcium stearate as additives were charged into a Henschel mixer (trade name) and mixed with stirring for three minutes. The mixture obtained was molten and extruded at 200° C. with an extruder having a bore diameter of 45 mm to obtain pellets.

COMPARATIVE EXAMPLE 15

The same constituents as in Example 33 except that the amount of the polypropylene resin was changed to 61 wt % and the ethylene-propylene rubber was not used, were charged into a Henschel mixer (trade name) and mixed with stirring, and the mixture obtained was molten and extruded to obtain pellets under the same conditions as in Example 33.

EXAMPLES 34 AND 35, COMPARATIVE EXAMPLE 16

Pellets were obtained under the same conditions as in Example 33 except that the formulation amounts of the polypropylene resin and the ethylene-propylene rubber were changed to those shown in Table 5.

COMPARATIVE EXAMPLE 17

Pellets were obtained under the same conditions as in Example 33 except that the formulation amounts of the polypropylene resin and the polyethylene resin were changed to those shown in Table 5.

The pellets obtained in Examples 33-35 and Comparative Examples 15-17 were dried at 100° C. for three hours and molded with an injection molding machine in which the maximum temperature of the cylinder was set at 220° C. to obtain definite test pieces for evaluating their flame retardance and bleed resistance.

The bleed resistance of the test pieces was evaluated under conditions of high temperature and high humidity. The results are shown in Table 5.

As shown in Table 5, when the ethylene-propylene rubber was added, the bleeding under conditions of high temperature and high humidity was improved. It was found that preferable formulation amounts of the ethylene-propylene rubber were 5-25 wt %.

EXAMPLE 36

50 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 10 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 10 wt % of ethylene-propylene rubber (manufactured by Japan Synthetic Rubber Co. Ltd., EP-02P) as olefinic synthetic rubber, 1.0 wt % of vinyltrimethoxysilane (manufactured by CHISSO CORPORATION, Sairaace (trade mark) S210) as a silane coupling agent, 21 wt % of ammonium polyphosphate (manufactured by Sumitomo Chemical Co., Ltd., Sumisafe P (trade mark)), 8 wt % of a polymer of 2-piperazinilene-4-morpholino-1,3,5-triazine (n=11, molecular weight: about 2770) as a nitrogen organic compound, 0.15 wt % of 2,6-di-t-butyl-p-cresol, 0.2 wt % of di-myristyl-$\beta,\beta$-thiodipropionate and 0.1 wt % of calcium stearate as additives were charged into a Henschel mixer (Trade name) and mixed with stirring for three minutes. The mixture obtained was molten and extruded at 200° C. with an extruder having a bore diameter of 45 mm to obtain pellets.

COMPARATIVE EXAMPLE 18

The same constituents as in Example 36, except that the amount of the polypropylene resin was changed to 61 wt % and the ethylene-propylene rubber and the silane coupling agent were not used, were charged into a Henschel mixer (trade name) and mixed with stirring, and the mixture obtained was molten and extruded to obtain pellets under the same conditions as in Example 36.

EXAMPLES 37-43, COMPARATIVE EXAMPLES 19-21

Pellets were obtained under the same conditions as in Example 36 except that the mixing amounts of the polypropylene resin, the ethylene-propylene rubber and the silane coupling agent were changed to those shown in Table 6.

COMPARATIVE EXAMPLE 22

Pellets were obtained under the same conditions as in Example 36 except that the mixing amounts of the polypropylene resin and the polyethylene resin were changed to those shown in Table 6.

The pellets obtained in Examples 36-43 and Comparative Examples 18-22 were dried at 100° C. for three hours and molded with an injection molding machine in which the maximum temperature of the cylinder was set at 220° C. to obtain definite test pieces for evaluating their flame retardance and bleed resistance.

The bleed resistance of the test pieces was evaluated under the conditions of high temperature and high humidity. The results are shown in Table 6.

As shown in Table 6, when the silane coupling agent and the ethylene-propylene rubber were added, the bleeding under conditions of high temperature and high humidity was improved.

TABLE 4

| | Constituents (wt %) | | | | | Surface resistivity ($\Omega$) | | Days of | Flame retardance |
| | | | | | | before moistening*1 | 7 days after moistening*2 | no bleed | (0.8 mm) |
| --- | --- | --- | --- | --- | --- | --- | --- | --- | --- |
| | (E) | (A) | (B) | (C) | (P) | | | | |
| Example 22 | 15 | $A_1$ 1.0 | 21 | $C_1$ 8 | 55 | $6.7 \times 10^{16}$ | $6.5 \times 10^{17}$ | 20> | V-0 |
| Comparative Example 10 | 15 | 0 | 21 | $C_1$ 8 | 56 | $4.1 \times 10^{17}$ | $2.4 \times 10^{12}$ | 7> | V-0 |
| Example 23 | 15 | $A_2$ 1.0 | 21 | $C_1$ 8 | 55 | $2.1 \times 10^{16}$ | $4.0 \times 10^{16}$ | 14> | V-0 |
| Example 24 | 15 | $A_3$ 1.0 | 21 | $C_1$ 8 | 55 | $1.3 \times 10^{16}$ | $3.5 \times 10^{16}$ | 14> | V-0 |
| Example 25 | 15 | $A_4$ 1.0 | 21 | $C_1$ 8 | 55 | $6.7 \times 10^{17}$ | $3.1 \times 10^{16}$ | 14> | V-0 |
| Example 26 | 15 | $A_5$ 1.0 | 21 | $C_1$ 8 | 55 | $2.1 \times 10^{17}$ | $3.5 \times 10^{16}$ | 14> | V-0 |
| Example 27 | 15 | $A_6$ 1.0 | 21 | $C_1$ 8 | 55 | $7.0 \times 10^{16}$ | $2.9 \times 10^{17}$ | 20< | V-0 |
| Comparative Example 11 | 15 | $A_1$ 0.2 | 21 | $C_1$ 8 | 55.8 | $5.1 \times 10^{17}$ | $1.5 \times 10^{11}$ | 7> | V-0 |
| Example 28 | 15 | $A_1$ 0.3 | 21 | $C_1$ 8 | 55.7 | $1.2 \times 10^{16}$ | $1.0 \times 10^{16}$ | 14> | V-0 |
| Example 29 | 15 | $A_1$ 0.5 | 21 | $C_1$ 8 | 55.5 | $1.3 \times 10^{17}$ | $6.7 \times 10^{16}$ | 14> | V-0 |
| Example 30 | 15 | $A_1$ 3.0 | 21 | $C_1$ 8 | 53 | $3.2 \times 10^{16}$ | $2.5 \times 10^{16}$ | 20< | V-0 |
| Comparative Example 12 | 15 | $A_1$ 6.0 | 21 | $C_1$ 8 | 50 | $5.3 \times 10^{16}$ | $3.5 \times 10^{16}$ | 20< | impossible*3 |
| Example 31 | 15 | $A_1$ 1.0 | 21 | $C_2$ 8 | 55 | $6.2 \times 10^{16}$ | $5.1 \times 10^{16}$ | 20> | V-0 |
| Comparative Example 13 | 0 | $A_1$ 1.0 | 21 | $C_1$ 8 | 70 | $2.8 \times 10^{17}$ | $4.2 \times 10^{16}$ | 14> | V-2 |
| Example 32 | 12 | $A_1$ 1.0 | 21 | $C_1$ 8 | 58 | $7.2 \times 10^{16}$ | $2.9 \times 10^{17}$ | 14> | V-0 |
| Comparative Example 14 | 30 | $A_1$ 1.0 | 21 | $C_1$ 8 | 40 | $6.7 \times 10^{16}$ | $4.8 \times 10^{16}$ | 14> | V-2 |

TABLE 5

| | Constituents (wt %) | | | | | Surface resistivity ($\Omega$) | | Days of | Flame retardance |
| | | | | | | before moistening*1 | 7 days after moistening*2 | no bleed | (0.8 mm) |
| --- | --- | --- | --- | --- | --- | --- | --- | --- | --- |
| | (E) | (E) | (B) | ($C_1$) | (P) | | | | |
| Example 33 | 10 | 10 | 21 | 8 | 51 | $5.2 \times 10^{17}$ | $5.2 \times 10^{17}$ | 20> | V-0 |
| Comparative Example 15 | 10 | 0 | 21 | 8 | 61 | $4.5 \times 10^{17}$ | $3.5 \times 10^{12}$ | 7> | V-0 |
| Example 34 | 10 | 5 | 21 | 8 | 56 | $7.5 \times 10^{16}$ | $5.4 \times 10^{16}$ | 14> | V-0 |
| Example 35 | 10 | 20 | 21 | 8 | 41 | $2.4 \times 10^{16}$ | $3.1 \times 10^{16}$ | 20< | V-0 |
| Comparative Example 16 | 10 | 30 | 21 | 8 | 31 | $6.3 \times 10^{16}$ | $7.1 \times 10^{16}$ | 20< | impossible*3 |
| Comparative Example 17 | 0 | 10 | 21 | 8 | 61 | $3.2 \times 10^{17}$ | $4.8 \times 10^{16}$ | 20> | V-2 |

TABLE 6

| | Constituents (wt %) | | | | | |
| --- | --- | --- | --- | --- | --- | --- |
| | (E) | (A) | (D) | (B) | ($C_1$) | (P) |
| Example 36 | 10 | 1.0 | 10 | 21 | 8 | 50 |
| Comparative Example 18 | 10 | 0 | 0 | 21 | 8 | 61 |
| Comparative Example 19 | 10 | 0.3 | 3 | 21 | 8 | 57.7 |
| Example 37 | 10 | 0.5 | 3 | 21 | 8 | 57.5 |
| Example 38 | 10 | 1.0 | 3 | 21 | 8 | 57 |
| Example 39 | 10 | 0.3 | 5 | 21 | 8 | 55.7 |
| Example 40 | 10 | 0.5 | 5 | 21 | 8 | 55.5 |
| Example 41 | 10 | 1.0 | 5 | 21 | 8 | 55 |
| Comparative Example 20 | 10 | 6.0 | 5 | 21 | 8 | 50 |
| Example 42 | 10 | 0.5 | 10 | 21 | 8 | 50.5 |
| Example 43 | 10 | 2.0 | 10 | 21 | 8 | 49 |
| Comparative Example 21 | 10 | 1.0 | 30 | 21 | 8 | 30 |
| Comparative | 0 | 1.0 | 10 | 21 | 8 | 60 |

TABLE 6-continued

Example 22

| | surface resistivity ($\Omega$) | | Days of no bleed | Flame retardance (0.8 mm) |
|---|---|---|---|---|
| | before moistening*1 | 7 days after moistening*2 | | |
| Example 36 | $8.2 \times 10^{16}$ | $6.5 \times 10^{16}$ | 30< | V-0 |
| Comparative Example 18 | $4.5 \times 10^{17}$ | $3.5 \times 10^{12}$ | 7> | V-0 |
| Comparative Example 19 | $2.8 \times 10^{16}$ | $5.5 \times 10^{12}$ | 7> | V-0 |
| Example 37 | $3.3 \times 10^{16}$ | $1.5 \times 10^{16}$ | 20> | V-0 |
| Example 38 | $6.2 \times 10^{17}$ | $5.3 \times 10^{16}$ | 20> | V-0 |
| Example 39 | $3.2 \times 10^{16}$ | $2.5 \times 10^{16}$ | 20> | V-0 |
| Example 40 | $5.5 \times 10^{16}$ | $>9.4 \times 10^{18}$ | 20< | V-0 |
| Example 41 | $9.4 \times 10^{17}$ | $7.2 \times 10^{16}$ | 20< | V-0 |
| Comparative Example 20 | $4.2 \times 10^{16}$ | $3.1 \times 10^{16}$ | 20< | impossible*3 |
| Example 42 | $1.7 \times 10^{16}$ | $>9.4 \times 10^{18}$ | 20< | V-0 |
| Example 43 | $9.4 \times 10^{16}$ | $5.2 \times 10^{16}$ | 20< | V-0 |
| Comparative Example 21 | $5.5 \times 10^{16}$ | $3.8 \times 10^{16}$ | 20< | impossible*3 |
| Comparative Example 22 | $3.7 \times 10^{17}$ | $3.5 \times 10^{16}$ | 20< | impossible*3 |

In Table 4–6.
Constituent (E): polyethylene resin manufactured by CHISSO CORPORATION, M680.
Constituents (A)–(D) and (P), and *1–3 are the same meaning as in Table 1–3.

EXAMPLE 44

52 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 15 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 1.0 wt % of vinyltrimethoxysilane (manufactured by CHISSO CORPORATION, Sairaace (trade mark) S210), 21 wt % of ammonium polyphosphate (manufactured by Sumitomo Chemical Co., Ltd., Sumisafe P (trade mark)), 8 wt % of a polymer of 2-piperazinilene-4-morpholino-1,3,5-triazine (n=11, molecular weight: about 2770) as a nitrogen organic compound, 2.5 wt % of pentaerythritol tetraacrylate, 0.5 wt % of trilauryl trithiophosphite, and 0.15 wt % of 2,6-di-t-butyl-p-cresol, 0.2 wt % of di-myristyl-$\beta,\beta$-thiodipropionate and 0.1 wt % of calcium stearate as additives were charged into a Henschel mixer (Trade name) and mixed with stirring for three minutes. The mixture obtained was molten and extruded at 200° C. with an extruder having a bore diameter of 45 mm to obtain pellets.

COMPARATIVE EXAMPLE 23

The same constituents as in Example 44, except that the amount of the polypropylene resin was changed to 53 wt % and the silane coupling agent was not used, were charged into a Henschel mixer (Trade name) and mixed with stirring, and the mixture obtained was molten and extruded to obtain pellets under the same conditions as in Example 44.

EXAMPLES 45–49

Pellets were obtained under the same conditions as in Example 44 except that the silane coupling agent was changed to the silane coupling agents shown in Table 7.

EXAMPLES 50 AND 51, COMPARATIVE EXAMPLES 24 AND 25

Pellets were obtained under the same conditions as in Example 44 except that the mixing amounts of the polypropylene resin and the silane coupling agent were changed to those shown in Table 7.

EXAMPLE 52

Pellets were obtained under the same conditions as in Example 44 except that a reaction product of ethylene urea and formaldehyde was used as the nitrogen organic compound.

COMPARATIVE EXAMPLES 26 AND 27

Pellets were obtained under the same conditions as in Example 44 except that the mixing amounts of the polypropylene resin and the polyethylene resin were changed to those shown in Table 7.

COMPARATIVE EXAMPLES 28–30

Pellets were obtained under the same conditions as in Example 44 except that the mixing amount of the polypropylene resin, pentaerythritol tetraacrylate and trilauryl trithiophosphite were changed to those shown in Table 7.

The pellets obtained in Examples 44–52 and Comparative Examples 23–30 were dried at 100° C. for three hours and molded with an injection molding machine in which the maximum temperature of the cylinder was set at 220° C. to obtain definite test pieces for evaluating their flame retardance and bleed resistance.

The bleed resistance of the test pieces was evaluated under the conditions of high temperature and high humidity. The results are shown in Table 7.

As shown in Table 7, when the silane coupling agent was added, the bleeding under conditions of high temperature and high humidity was improved. It was found that preferable formulation amounts of the silane coupling agent were 0.3–5 wt %.

EXAMPLE 53

48 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 10 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 10 wt % of ethylene-propylene rubber (manufactured by Japan Synthetic Rubber Co. Ltd., EP-02P) as olefinic synthetic rubber, 21 wt % of ammonium polyphosphate (manufactured by Sumitomo Chemical Co., Ltd., Sumisafe P (trade mark)), 8 wt % of a polymer of 2piperazinilene-4-morpholino-1,3,5-triazine (n=11, molecular weight: about 2770) as a nitrogen organic compound, 2.5 wt % of pentaerythritol tetraacrylate, 0.5 wt % of trilauryl trithiophosphite, and 0.15 wt % of 2,6-di-t-butyl-p-cresol, 0.2 wt % of di-myristyl-$\beta,\beta$-thiodipropionate and 0.1 wt % of calcium stearate as additives were charged into a Henschel mixer (trade name) and mixed with stirring for three minutes. The mixture obtained was molten and extruded at 200° C. with an extruder having a bore diameter of 45 mm to obtain pellets.

COMPARATIVE EXAMPLE 31

The same constituents as in Example 53 except that the amount of the polypropylene resin was changed to 58 wt % and the ethylene-propylene rubber was not used were charged into a Henschel mixer (trade name) and mixed with stirring, and the mixture obtained was molten and extruded to obtain pellets under the same conditions as in Example 53.

EXAMPLES 54 AND 55, COMPARATIVE EXAMPLES 32 AND 33

Pellets were obtained under the same conditions as in Example 53 except that the formulation amounts of the polypropylene resin and the ethylene-propylene rubber were changed to those shown in Table 8.

COMPARATIVE EXAMPLE 34

Pellets were obtained under the same conditions as in Example 53 except that the formulation amounts of the polypropylene resin and the polyethylene resin were changed to those shown in Table 8.

The pellets obtained in Examples 53-55 and Comparative Examples 31-34 were dried at 100° C. for three hours and molded with an injection molding machine in which the maximum temperature of the cylinder was set at 220° C. to obtain definite test pieces for evaluating their flame retardance and bleed resistance. The bleed resistance of the test pieces was evaluated under the conditions of high temperature and high humidity. The results are shown in Table 8.

As shown in Table 8, when the ethylene-propylene rubber was added, the bleeding under the conditions of high temperature and high humidity was improved. It was found that preferable formulation amounts of the ethylene-propylene rubber were 3-25 wt %.

EXAMPLE 56

47 wt % of a crystalline ethylene-propylene block copolymer as polypropylene resin, which contains 8.5 wt % of ethylene and has a melt flow rate (melt flow amount of melt resin for 10 minutes at 230° C. under a load of 2.16 kg) of 20 g/10 min., 10 wt % of polyethylene (manufactured by CHISSO CORPORATION, CHISSOPOLYETHY (trade mark) M680) as polyethylene resin, which has a melt index (melt flow amount of melt resin for 10 minutes at 190° C. under a load of 2.16 kg) of 6.5 g/10 min., 10 wt % of ethylene-propylene rubber (manufactured by Japan Synthetic Rubber Co. Ltd., EP-02P) as olefinic synthetic rubber, 1.0 wt % of vinyltrimethoxysilane (manufactured by CHISSO CORPORATION, Sairaace (trade mark) S210) as a silane coupling agent, 21 wt % of ammonium polyphosphate (manufactured by Sumitomo Chemical Co., Ltd., Sumisafe P (trade mark)), 8 wt % of a polymer of 2piperazinilene-4-morpholino-1,3,5-triazine (n=11, molecular weight: about 2770) as a nitrogen organic compound, 2.5 wt % of pentaerythritol tetraacrylate, 0.5 wt % of trilauryl trithiophosphite, 0.15 wt % of 2,6-di-t-butyl-p-cresol, and 0.2 wt % of di-myristyl-$\beta,\beta$-thiodipropionate and 0.1 wt % of calcium stearate as additives were charged into a Henschel mixer (Trade name) and mixed with stirring for three minutes. The mixture obtained was molten and extruded at 200° C. with an extruder having a bore diameter of 45 mm to obtain pellets.

COMPARATIVE EXAMPLE 35

The same constituents as in Example 56, except that the amount of the polypropylene resin was changed to 58 wt % and the ethylene-propylene rubber and the silane coupling agent were not used, were charged into a Henschel mixer (Trade name) and mixed with stirring, and the mixture obtained was molten and extruded to obtain pellets under the same conditions as in Example 56.

EXAMPLES 57-64, COMPARATIVE EXAMPLES 36-38

Pellets were obtained under the same conditions as in Example 56 except that the mixing amounts of the polypropylene resin, the ethylene-propylene rubber and the silane coupling agent were changed to those shown in Table 9.

COMPARATIVE EXAMPLE 39

Pellets were obtained under the same conditions as in Example 56 except that the mixing amounts of the polypropylene resin and the polyethylene resin were changed to those shown in Table 9.

The pellets obtained in Examples 56-64 and Comparative Examples 35-39 were dried at 100° C. for three hours and molded with an injection molding machine in which the maximum temperature of the cylinder was set at 220° C. to obtain definite test pieces for evaluating their flame retardance and bleed resistance. The bleed resistance of the test pieces was evaluated under the conditions of high temperature and high humidity. The results are shown in Table 9.

As shown in Table 9, when the silane coupling agent and the ethylene-propylene rubber were added, the bleeding under conditions of high temperature and high humidity was improved.

TABLE 7

| | Constituents (wt %) | | | | | | |
|---|---|---|---|---|---|---|---|
| | (E) | (A) | | (B) | (C) | | (F) | (G) | (P) |
| Example 44 | 15 | $A_1$ | 1.0 | 21 | $C_1$ | 8 | 2.5 | 0.5 | 52.0 |
| Comparative Example 23 | 15 | $A_1$ | 0 | 21 | $C_1$ | 8 | 2.5 | 0.5 | 53.0 |
| Example 45 | 15 | $A_2$ | 1.0 | 21 | $C_1$ | 8 | 2.5 | 0.5 | 52.0 |
| Example 46 | 15 | $A_3$ | 1.0 | 21 | $C_1$ | 8 | 2.5 | 0.5 | 52.0 |
| Example 47 | 15 | $A_4$ | 1.0 | 21 | $C_1$ | 8 | 2.5 | 0.5 | 52.0 |
| Example 48 | 15 | $A_5$ | 1.0 | 21 | $C_1$ | 8 | 2.5 | 0.5 | 52.0 |
| Example 49 | 15 | $A_6$ | 1.0 | 21 | $C_1$ | 8 | 2.5 | 0.5 | 52.0 |
| Comparative Example 24 | 15 | $A_1$ | 0.2 | 21 | $C_1$ | 8 | 2.5 | 0.5 | 52.8 |
| Example 50 | 15 | $A_1$ | 0.3 | 21 | $C_1$ | 8 | 2.5 | 0.5 | 52.7 |
| Example 51 | 15 | $A_1$ | 3.0 | 21 | $C_1$ | 8 | 2.5 | 0.5 | 50.0 |
| Comparative Example 25 | 15 | $A_1$ | 6.0 | 21 | $C_1$ | 8 | 2.5 | 0.5 | 47.0 |
| Example 52 | 15 | $A_1$ | 1.0 | 21 | $C_2$ | 8 | 2.5 | 0.5 | 52.0 |
| Comparative Example 26 | 0 | $A_1$ | 1.0 | 21 | $C_1$ | 8 | 2.5 | 0.5 | 67.0 |
| Comparative Example 27 | 35 | $A_1$ | 1.0 | 21 | $C_1$ | 8 | 2.5 | 0.5 | 32.0 |
| Comparative Example 28 | 15 | $A_1$ | 1.0 | 21 | $C_1$ | 8 | 0 | 0 | 55.0 |
| Comparative Example 29 | 15 | $A_1$ | 1.0 | 21 | $C_1$ | 8 | 2.5 | 0 | 52.5 |
| Comparative Example 30 | 15 | $A_1$ | 1.0 | 21 | $C_1$ | 8 | 0 | 0.5 | 54.5 |

| | Surface resistivity ($\Omega$) | | Days of no bleed | Flame retardance (3.0 mm) |
|---|---|---|---|---|
| | before moistening[*1] | 7 days after moistening[*2] | | |
| Example 44 | $8.2 \times 10^{16}$ | $5.9 \times 10^{17}$ | 20> | 5 V |
| Comparative Example 23 | $5.2 \times 10^{17}$ | $3.4 \times 10^{12}$ | 7> | 5 V |

TABLE 7-continued

| | | | | |
|---|---|---|---|---|
| Example 45 | $3.2 \times 10^{16}$ | $4.5 \times 10^{16}$ | 14> | 5 V |
| Example 46 | $2.9 \times 10^{16}$ | $2.8 \times 10^{16}$ | 14> | 5 V |
| Example 47 | $5.3 \times 10^{17}$ | $3.1 \times 10^{16}$ | 14> | 5 V |
| Example 48 | $3.1 \times 10^{17}$ | $3.3 \times 10^{16}$ | 14> | 5 V |
| Example 49 | $6.5 \times 10^{16}$ | $3.1 \times 10^{17}$ | 20< | 5 V |
| Comparative Example 24 | $5.5 \times 10^{17}$ | $3.0 \times 10^{11}$ | 7> | 5 V |
| Example 50 | $2.5 \times 10^{16}$ | $7.0 \times 10^{16}$ | 14> | 5 V |
| Example 51 | $3.5 \times 10^{16}$ | $2.4 \times 10^{16}$ | 20< | 5 V |
| Comparative Example 25 | $7.1 \times 10^{16}$ | $5.2 \times 10^{16}$ | 20< | inapplicable |
| Example 52 | $5.5 \times 10^{17}$ | $8.1 \times 10^{16}$ | 20> | inapplicable |
| Comparative Example 26 | $6.7 \times 10^{17}$ | $4.5 \times 10^{16}$ | 14> | inapplicable |
| Comparative Example 27 | $4.5 \times 10^{17}$ | $6.5 \times 10^{16}$ | 14> | inapplicable |
| Comparative Example 28 | $3.5 \times 10^{16}$ | $2.4 \times 10^{16}$ | 20> | inapplicable |
| Comparative Example 29 | $4.2 \times 10^{17}$ | $3.5 \times 10^{17}$ | 20> | inapplicable |
| Comparative Example 30 | $4.4 \times 10^{17}$ | $2.8 \times 10^{17}$ | 20> | inapplicable |

TABLE 8

| | Constituents (wt %) | | | | | | |
|---|---|---|---|---|---|---|---|
| | (E) | (D) | (B) | (C₁) | (F) | (G) | (P) |
| Example 53 | 10 | 10 | 21 | 8 | 2.5 | 0.5 | 48.0 |
| Comparative Example 31 | 10 | 0 | 21 | 8 | 2.5 | 0.5 | 58.0 |
| Comparative Example 32 | 10 | 2 | 21 | 8 | 2.5 | 0.5 | 56.0 |
| Example 54 | 10 | 3 | 21 | 8 | 2.5 | 0.5 | 55.0 |
| Example 55 | 10 | 25 | 21 | 8 | 2.5 | 0.5 | 33.0 |
| Comparative Example 33 | 10 | 30 | 21 | 8 | 2.5 | 0.5 | 28.0 |
| Comparative Example 34 | 0 | 10 | 21 | 8 | 2.5 | 0.5 | 58.0 |

| | Surface resistivity (Ω) | | Days of no bleed | Flame retardance (3.0 mm) |
|---|---|---|---|---|
| | before moistening*1 | 7 days after moistening*2 | | |
| Example 53 | $6.1 \times 10^{17}$ | $4.2 \times 10^{17}$ | 20> | 5 V |
| Comparative Example 31 | $5.5 \times 10^{11}$ | $2.8 \times 10^{12}$ | 7> | 5 V |
| Comparative Example 32 | $8.1 \times 10^{16}$ | $6.4 \times 10^{12}$ | 7> | 5 V |
| Example 54 | $3.4 \times 10^{16}$ | $4.1 \times 10^{16}$ | 14> | 5 V |
| Example 55 | $5.3 \times 10^{17}$ | $3.1 \times 10^{16}$ | 20< | 5 V |
| Comparative Example 33 | $7.3 \times 10^{17}$ | $7.1 \times 10^{16}$ | 20< | inapplicable |
| Comparative Example 34 | $4.2 \times 10^{16}$ | $4.8 \times 10^{16}$ | 20> | inapplicable |

TABLE 9

| | Constituents (wt %) | | | | | | | |
|---|---|---|---|---|---|---|---|---|
| | (E) | (A₁) | (D) | (B) | (C₁) | (F) | (G) | (P) |
| Example 56 | 10 | 1.0 | 10 | 21 | 8 | 2.5 | 0.5 | 47.0 |
| Comparative Example 35 | 10 | 0 | 0 | 21 | 8 | 2.5 | 0.5 | 58.0 |
| Comparative Example 36 | 10 | 0.2 | 2 | 21 | 8 | 2.5 | 0.5 | 55.8 |
| Example 57 | 10 | 0.3 | 3 | 21 | 8 | 2.5 | 0.5 | 54.7 |
| Example 58 | 10 | 0.5 | 3 | 21 | 8 | 2.5 | 0.5 | 54.5 |
| Example 59 | 10 | 1.0 | 3 | 21 | 8 | 2.5 | 0.5 | 54.0 |
| Example 60 | 10 | 0.3 | 5 | 21 | 8 | 2.5 | 0.5 | 52.7 |
| Example 61 | 10 | 0.5 | 5 | 21 | 8 | 2.5 | 0.5 | 52.5 |
| Example 62 | 10 | 1.0 | 5 | 21 | 8 | 2.5 | 0.5 | 52.0 |
| Comparative Example 37 | 10 | 6.0 | 5 | 21 | 8 | 2.5 | 0.5 | 47.0 |
| Example 63 | 10 | 0.5 | 10 | 21 | 8 | 2.5 | 0.5 | 47.5 |
| Example 64 | 10 | 2.0 | 10 | 21 | 8 | 2.5 | 0.5 | 46.0 |
| Comparative Example 38 | 10 | 1.0 | 30 | 21 | 8 | 2.5 | 0.5 | 27.0 |
| Comparative Example 39 | 0 | 1.0 | 10 | 21 | 8 | 2.5 | 0.5 | 57.0 |

TABLE 9-continued

| | surface resistivity (Ω) | | Days of no bleed | Flame retardance (3.0 mm) |
|---|---|---|---|---|
| | before moistening*1 | 7 days after moistening*2 | | |
| Example 56 | $7.8 \times 10^{16}$ | $4.3 \times 10^{16}$ | 30< | 5 V |
| Comparative Example 35 | $5.5 \times 10^{17}$ | $4.5 \times 10^{12}$ | 7> | 5 V |
| Comparative Example 36 | $3.9 \times 10^{16}$ | $6.2 \times 10^{11}$ | 7> | 5 V |
| Example 57 | $4.3 \times 10^{16}$ | $2.5 \times 10^{16}$ | 14> | 5 V |
| Example 58 | $6.3 \times 10^{17}$ | $5.3 \times 10^{16}$ | 14> | 5 V |
| Example 59 | $3.8 \times 10^{17}$ | $3.5 \times 10^{16}$ | 20> | 5 V |
| Example 60 | $4.5 \times 10^{16}$ | $8.5 \times 10^{17}$ | 20> | 5 V |
| Example 61 | $8.4 \times 10^{17}$ | $6.2 \times 10^{16}$ | 20< | 5 V |
| Example 62 | $4.2 \times 10^{16}$ | $3.6 \times 10^{16}$ | 20< | 5 V |
| Comparative Example 37 | $2.3 \times 10^{16}$ | $5.4 \times 10^{16}$ | 20< | inapplicable |
| Example 63 | $2.4 \times 10^{16}$ | $5.2 \times 10^{16}$ | 20< | 5 V |
| Example 64 | $5.7 \times 10^{17}$ | $4.5 \times 10^{16}$ | 20< | 5 V |
| Comparative Example 38 | $6.7 \times 10^{17}$ | $4.5 \times 10^{16}$ | 20< | inapplicable |
| Comparative Example 39 | $5.5 \times 10^{17}$ | $2.3 \times 10^{16}$ | 20< | inapplicable |

We claim:

1. A flame retardant composition of polypropylene resin containing polypropylene as a principal constituent and the following constituents (A) to (C) making a total of 100 wt %:

| | | |
|---|---|---|
| (A) | silane coupling agent | 0.3-5 wt %, |
| (B) | ammonium polyphosphate or melamine-modified ammonium polyphosphate | 12-25 wt %, and |
| (C) | one or more nitrogen organic compounds which upon pyrolysis of the mixture of said one or more nitrogen organic compounds, polypropylene resin and ammonium polyphosphate or melamine-modified ammonium polyphosphate is capable of producing nonflammable gaseous products and carbonaceous residues | 5-10 wt %. |

2. A flame retardant composition of polypropylene resin containing polypropylene as a principal constituent and the following constituents (A) to (D), making a total of 100 wt %:

| | | |
|---|---|---|
| (A) | silane coupling agent | 0.3-5 wt %, |
| (B) | ammonium polyphosphate or melamine-modified ammonium polyphosphate | 12-25 wt %, |
| (C) | at least one nitrogen organic compound which upon pyrolysis of the mixture of said at least one nitrogen organic compound, polypropylene resin and ammonium polyphosphate or melamine-modified ammonium phosphate is capable of producing nonflammable gaseous products and carbonaceous residues | 5-10%, and |
| (D) | olefinic synthetic rubber | 3-25%. |

3. A flame retardant composition of polypropylene resin containing polypropylene as a principal constituent and the following constituents (A) to (C) and (E), making a total of 100 wt %:

| | | |
|---|---|---|
| (A) | silane coupling agent | 0.3-5 wt %, |
| (B) | ammonium polyphosphate or melamine-modified ammonium polyphosphate | 12-25 wt %, |
| (C) | at least one nitrogen organic compound which upon pyrolysis of the mixture of | 5-10 wt %, and |

|     |     |     |
| --- | --- | --- |
|     | said at least one nitrogen organic compound, polypropylene resin and ammonium polyphosphate or melamine-modified ammonium polyphosphate is capable of producing nonflammable gaseous products and carbonaceous residues |     |
| (E) | polyethylene resin | 5-25 wt %. |

4. A flame retardant composition of polypropylene resin containing polypropylene as a principal constituent and the following constituents (B) to (E), making a total of 100 wt %:

|     |     |     |
| --- | --- | --- |
| (B) | ammonium polyphosphate or melamine-modified ammonium polyphosphate | 12-25 wt %, |
| (C) | at least one nitrogen organic compound which upon pyrolysis of the mixture of said at least one nitrogen organic compound, polypropylene resin and ammonium polyphosphate or melamine-modified ammonium polyphosphate is capable of producing nonflammable gaseous products and carbonaceous residues | 5-10%, |
| (D) | olefinic synthetic rubber | 3-25 wt %, and |
| (E) | polyethylene resin | 5-25%. |

5. A flame retardant composition of polypropylene resin containing polypropylene as a principal constituent and the following constituents (A) to (E), making a total of 100 wt %:

|     |     |     |
| --- | --- | --- |
| (A) | silane coupling agent | 0.3-5 wt %, |
| (B) | ammonium polyphosphate or melamine-modified ammonium polyphosphate | 12-25 wt %, |
| (C) | at least one nitrogen organic compound which upon pyrolysis of the mixture of said at least one nitrogen organic compound, polypropylene resin and ammonium polyphosphate or melamine-modified ammonium polyphosphate is capable of producing nonflammable gaseous products and carbonaceous residues | 5-10 wt %, |
| (D) | olefinic synthetic rubber | 3-25 wt %, and |
| (E) | polyethylene resin | 5-25 wt %. |

6. A flame retardant composition of polypropylene resin containing polypropylene as a principal constituent and the following constituents (A) to (C) and (E) to (G), making a total of 100 wt %:

|     |     |     |
| --- | --- | --- |
| (A) | silane coupling agent | 0.3-5 wt %, |
| (B) | ammonium polyphosphate or melamine-modified ammonium polyphosphate | 12-25% wt %, |
| (C) | at least one nitrogen organic compound which upon pyrolysis of the mixture of said at least one nitrogen organic compound, polypropylene resin and ammonium polyphosphate or melamine-modified ammonium polyphosphate is capable of producing nonflammable gaseous products and carbonaceous residues | 5-10%, |
| (E) | polyethylene resin | 5-30%, |
| (F) | crosslinking agent | 1.0-15 wt %, and |
| (G) | one or more thiophosphite selected from the group consisting of the following general formula (I), (II), (III) and (IV) | 0.05-5 wt % |

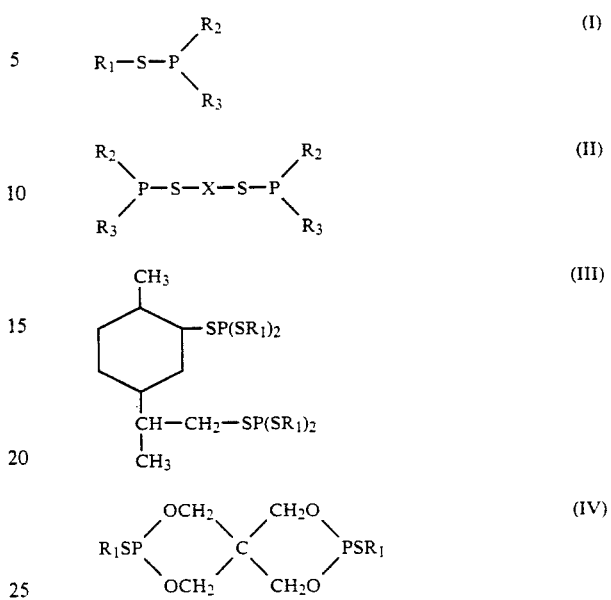

wherein $R_1$ is alkyl, cycloalkyl or aryl of more than 6 carbon atoms, $R_2$ is $-SR_2'$ or $-R_2'$, $R_3$ is $-SR_3'$ or $-R_3'$, $-R_2'$ and $-R_3'$ are the same or different alkyl, cycloalkyl or aryl, X is $-(CH_2)_n-$, $-(CH_2)_n-O-(CH_2)_m$, or

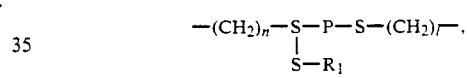

and n, m and l are the same or different integers of 2-6.

7. A flame retardant composition of polypropylene resin containing polypropylene as a principal constituent and the following constituents (A) to (G), making a total of 100 wt %:

|     |     |     |
| --- | --- | --- |
| (A) | silane coupling agent | 0.3-5 wt %, |
| (B) | ammonium polyphosphate or melamine-modified ammonium polyphosphate | 12-25 wt %, |
| (C) | at least one nitrogen organic compound which upon pyrolysis of the mixture of said at least one nitrogen organic compound, polypropylene resin and ammonium polyphosphate or melamine-modified ammonium polyphosphate is capable of producing nonflammable gaseous products and carbonaceous residues | 5-10%, |
| (D) | olefinic synthetic rubber | 3-25 wt %, |
| (E) | polyethylene resin | 5-30 wt %, |
| (F) | crosslinking agent | 1.0-15 wt %, and |
| (G) | at least one thiophosphite | 0.05-5 wt % | selected form the group consisting of the following general formula (I), (II), (III) and (IV)

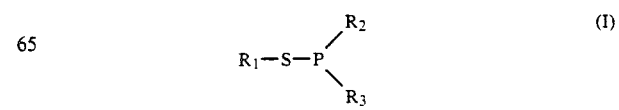

-continued

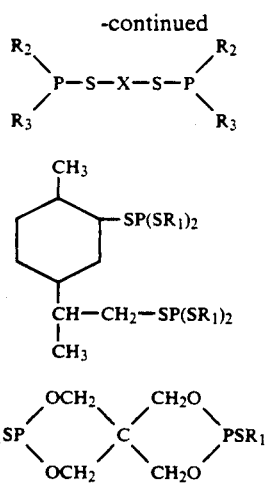

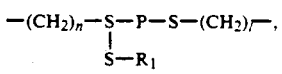

wherein $R_1$ is alkyl, cycloalkyl or aryl of more than 6 carbon atoms, $R_2$ is $-SR_2'$ or $-R_2'$, $R_3$ is $-SR_3'$ or $-R_3'$, $-R_2'$ and $-R_3'$ are the same or different alkyl, cycloalkyl or aryl, X is $-(CH_2)_n-$, $-(CH_2)_n-O-(CH_2)_m$, or

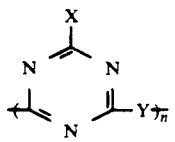

and n, m and l are the same or different integers of 2-6.

8. The composition according to claim 1, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

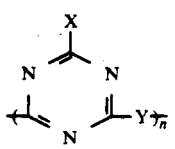

wherein X is morpholino or piperidino, Y is a divalent group of piperzine, and n is an integer of 2 to 50.

9. The composition according to claim 1, wherein said polypropylene resin is a crystalline propylene homopolymer, a crystalline copolymer of propylene of the principal constituent and one or more compounds selected from the group consisting of ethylene, 1-butene, 1-pentene, 1-hexane, 4-methylpentene-1, 1-heptene, 1-octene and 1-decene, or a mixture of two or more compounds selected from the above groups.

10. The composition according to claim 2, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

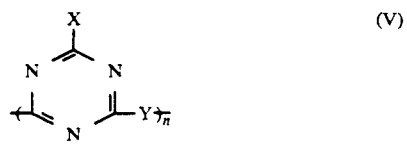

wherein X is morpholino or piperidino, Y is a divalent group of piperzine, and n is an integer of 2 to 50.

11. The composition according to claim 2, wherein said polypropylene resin is a crystalline propylene homopolymer, a crystalline copolymer of propylene of the principal constituent and one or more compounds selected from the group consisting of ethylene, 1-butene, 1-pentene, 1-hexane, 4-methylpentene-1, 1-heptene, 1-octene and 1-decene, or a mixture of two or more compounds selected from the above groups.

12. The composition according to claim 3, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

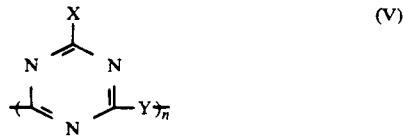

wherein X is morpholino or piperidino, Y is a divalent group of piperzine, and n is an integer of 2 to 50.

13. The composition according to claim 3, wherein said polypropylene resin is a crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above groups.

14. The composition according to claim 4, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

$$\text{(V)}$$

wherein X is morpholino or piperidino, Y is divalent group of piperazine, and n is an integer of 2 to 50.

15. The composition according to claim 4, wherein said polypropylene resin is a crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above groups.

16. The composition according to claim 5, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

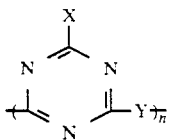

(V)

wherein X is morpholino or piperidino, Y is a divalent group of piperzine, and n is an integer of 2 to 50.

17. The composition according to claim 5, wherein said polypropylene resin is a crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above groups.

18. The composition according to claim 6, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

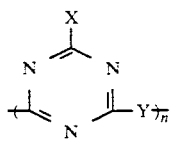

(V)

wherein X is morpholino or piperidino, Y is a divalent group of piperzine, and n is an integer of 2 to 50.

19. The composition according to claim 6, wherein said polypropylene resin is a crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above groups.

20. The composition according to claim 7, wherein said at least one nitrogen organic compound is selected from the group consisting of reaction products of ethylene urea and formaldehyde, reaction products of ethylene thiourea and formaldehyde, and 1,3,5-triazine derivatives represented by the formula:

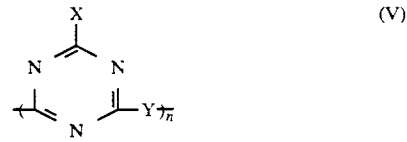

(V)

wherein X is morpholino or piperidino, Y is a divalent group of piperzine, and n is an integer of 2 to 50.

21. The composition according to claim 7, wherein said polypropylene resin is a crystalline propylene homopolymer, a crystalline copolymer of propylene of the principal constituent and one or more compounds selected from the group consisting of ethylene, 1-butene, 1-pentene, 1-hexene, 4-methylpentene-1, 1-heptene, 1-octene and 1-decene, or a mixture of two or more compounds selected from the above groups.

22. The composition according to claim 1 wherein said silane coupling agent is represented by the formula:

$$RR'SiX_2$$

wherein R is a hydrocarbon having a vinyl, chloro, amino, or mercapto group, X is an organic group which is hydrolyzable, R' is R or X, each X is the same or different from each other and, when R' is R, each R is the same or different.

23. The composition according to claim 1 wherein said silane coupling agent is a member from the group consisting of vinyl trimethoxy silane, vinyl triethoxy silane, 3-aminopropyl triethoxy silane, N-(2-aminoethyl)3-aminopropyl trimethoxy silane, 3-glycidoxypropyl trimethoxy silane, 3-chloropropyl trimethoxy silane, 3-metacryloxypropyl trimethoxy silane and 3-mercaptopropyl trimethoxy silane.

24. The composition according to claim 1 wherein said silane coupling agent comprises vinyl trimethoxy silane, vinyl triethoxy silane or 3-mercaptopropyl trimethoxy silane.

* * * * *

UNITED STATES PATENT AND TRADEMARK OFFICE
CERTIFICATE OF CORRECTION

PATENT NO. : 5,130,357

DATED : July 14, 1992

INVENTOR(S) : Akitaya et al.

It is certified that error appears in the above-identified patent and that said Letters Patent is hereby corrected as shown below:

Claim 6, column 25, line 52, change "siliane" to --silane--.

Claim 7, column 26, line 61, change "form" to --from--.

Claim 9, column 27, line 52, change "hexane" to --hexene--.

Claim 11, column 28, line 9, change "hexane" to --hexene--.

Claim 16, column 29, line 9, change "piperzine" to --piperazine--.

Claim 18, column 29, line 33, change "piperzine" to --piperazine--.

Claim 20, column 30, line 12, change "piperzine" to --piperazine--.

UNITED STATES PATENT AND TRADEMARK OFFICE
CERTIFICATE OF CORRECTION

PATENT NO. : 5,130,357

DATED : July 14, 1992

INVENTOR(S) : Akitaya et al.

It is certified that error appears in the above-identified patent and that said Letters Patent is hereby corrected as shown below:

Claim 23, column 30, line 38, change "metacryloxypropyl" to --methacryloxypropyl--.

Signed and Sealed this

Twenty-first Day of September, 1993

Attest:

BRUCE LEHMAN

*Attesting Officer*　　　*Commissioner of Patents and Trademarks*